US007120827B2

(12) United States Patent
Fujibayashi

(10) Patent No.: US 7,120,827 B2
(45) Date of Patent: Oct. 10, 2006

(54) SYSTEM AND METHOD OF VOLUME HEALTH CHECKING AND RECOVERY

(75) Inventor: Akira Fujibayashi, San Jose, CA (US)

(73) Assignee: Hitachi Ltd., Tokyo (JP)

( * ) Notice: Subject to any disclaimer, the term of this patent is extended or adjusted under 35 U.S.C. 154(b) by 487 days.

(21) Appl. No.: 10/140,581

(22) Filed: May 7, 2002

(65) Prior Publication Data

US 2003/0212920 A1  Nov. 13, 2003

(51) Int. Cl.
*G06F 11/00* (2006.01)

(52) U.S. Cl. ............................................. 714/7; 714/2
(58) Field of Classification Search ................ 714/7–8, 714/2, 5–6, 13, 15–16, 20
See application file for complete search history.

(56) References Cited

U.S. PATENT DOCUMENTS

| | | | |
|---|---|---|---|
| 5,403,639 A | | 4/1995 | Belsan et al. |
| 5,604,862 A * | | 2/1997 | Midgely et al. ................ 714/6 |
| 5,608,865 A | | 3/1997 | Midgely et al. |
| 5,649,152 A * | | 7/1997 | Ohran et al. ................. 711/114 |
| 5,678,042 A | | 10/1997 | Pisello et al. |
| 5,835,953 A * | | 11/1998 | Ohran ......................... 711/162 |
| 5,852,724 A | | 12/1998 | Glenn, II et al. |
| 6,038,639 A * | | 3/2000 | O'Brien et al. .............. 711/114 |
| 6,044,367 A | | 3/2000 | Wolff |
| 6,101,585 A * | | 8/2000 | Brown et al. ................ 711/162 |
| 6,212,531 B1 * | | 4/2001 | Blea et al. ................... 707/204 |
| 6,216,211 B1 * | | 4/2001 | McBrearty et al. .......... 711/162 |
| 6,311,193 B1 * | | 10/2001 | Sekido ........................ 707/202 |
| 6,330,570 B1 | | 12/2001 | Crighton |
| 6,338,150 B1 | | 1/2002 | Johnson et al. |
| 6,363,497 B1 | | 3/2002 | Chrabaszez |
| 6,434,481 B1 * | | 8/2002 | Winter et al. ................ 701/208 |
| 6,434,681 B1 * | | 8/2002 | Armangau .................. 711/162 |
| 6,567,774 B1 * | | 5/2003 | Lee et al. ....................... 703/23 |
| 6,651,075 B1 * | | 11/2003 | Kusters et al. .............. 707/204 |
| 6,708,227 B1 * | | 3/2004 | Cabrera et al. .............. 719/328 |
| 6,877,016 B1 * | | 4/2005 | Hart et al. ................... 707/201 |
| 6,968,347 B1 * | | 11/2005 | Gagne ......................... 707/202 |
| 2002/0016827 A1 * | | 2/2002 | McCabe et al. ............. 709/213 |
| 2002/0120605 A1 * | | 8/2002 | Gagne ............................ 707/1 |

OTHER PUBLICATIONS

Prepared by Enterprise Business Unit Compaq Computer Corporation; "Antivirus Solutions for the Compaq StorageWorks NAS Executor E7000"; Compaq Technical Guide; Dec. 2001, 7 pages.
Phillips, John; Antivirus Scanning Best Practices Guide [TR3107]; Printed May 7, 2002; 7 pages; Copyright 2002 Network Appliance, Inc. URL: http://www.netapp.com/tech_library/3107.print.

(Continued)

*Primary Examiner*—Dieu-Minh Le
(74) *Attorney, Agent, or Firm*—Sughrue Mion, PLLC; Pavel Pogodin, Esq.

(57) ABSTRACT

A system of volume health checking and recovery. The system comprises a health engine capable to check the health of a first volume that is a snapshot mirrored volume of a second volume; and a recovery engine, communicatively coupled to the health engine, capable to perform a recovery process if the first volume is unhealthy. Recovery can be performed via at least one of five methods.

20 Claims, 13 Drawing Sheets

OTHER PUBLICATIONS

Williams, Ross N.; "Data Integrity With Veracity"; Rocksoft; Sep. 12, 1994; pp. 1-13.

"High Availability—Eliminating Planned Downtime"; Oracle9i Database; 2 pages. URL:http://www.oracle.com/ip/deploy/database/oracle9i/index.html?ha_plandtime.html.

"Reducing Server Downtime: Simplified Availability"; NEC Computers White Paper; 7 pages; Copyright 2001 NEC Computers Inc.

Finlev, Gerson and Maryam Basiji; "Microsoft SQL Server 2000: Backup and Recovery Using a NetApp Filer"; TR 3109; Network Appliance, Inc.; 1 page.

"Novell StandbyServer 5.3 for NetWare"; 2 pages; Copyright Novell, Inc.

"Sun StorEdge Availability Suite Software"; 2 pages; Copyright 2001 Sun Microsystems, Inc.

* cited by examiner

| ID | Pair Group | Pair Name | Production Volume (Phy) | Paired volume (Phy) | File System Type | Valid | Date | Devicename (Logical) for Production Volume | Devicename (Logical) for Paired volume | MountPoint | Production Host | Application |
|---|---|---|---|---|---|---|---|---|---|---|---|---|
| 0 | Grp1 | Pair0 | Ldev#0, SID#1000 | Ldev#10, SID#1000 | Ufs | Invalid | 17MAR2002 0:03:50 | Vol01 | Vol04 on HST A Vol01 on HST C | /mnt0/data | HST A | DB |
| 1 | Grp2 | Pair1 | Ldev#0, SID#1000 | Ldev#11, SID#1000 | Vxfs | Valid | 16MAR2002 23:03:50 | Vol01 | Vol05 on HST A Vol02 on HST A | /mnt0/data | HST A | DB |
| 2 | Grp3 | Pair2 | Ldev#1, SID#1000 | Ldev#12, SID#1000 | Ufs | Valid | 16MAR2002 22:03:50 | Vol02 | Vol06 on HST A Vol03 on HST C | /mnt2/log | HST B | Flat file |
| 3 | Grp4 | Pair3 | Ldev#3, SID#1000 | Ldev#13, SID#1000 | Raw | Valid | 17MAR2002 1:03:00 | Vol03 | Vol07 on HST A Vol04 on HST C | | HST A | DB |

FIG. 8

SYSTEM AND METHOD OF VOLUME HEALTH CHECKING AND RECOVERY

TECHNICAL FIELD

This invention relates generally to volume health checking and recovery, and more particularly, but not exclusively, provides a system and method for non-disruptive volume health checking and recovery.

BACKGROUND

Servers, such as database servers, email servers, file servers, and so forth, hold large amounts of data. Checking the health of this data may disrupt online services on the servers because it requires a lot of CPU power and places a strain on the storage system. Disruption of services leads to slower system performance causing inconvenience for users and administrators. Accordingly, a new system and method is needed that enables volume health checking without placing a strain on the storage system and using a lot of CPU power.

SUMMARY

The present invention provides a system for volume health checking and recovery without disrupting online services. The system comprises a production server, a production volume, a backup management server and a snapshot mirrored volume. The production server includes an application that stores and accesses data on the production volume. The production server also includes an agent that manages communication between the production server and the backup management server. The agent also takes snapshots of the production volume. The production volume includes a logical volume used by the application and is mirrored by the snapshot mirrored volume.

The backup management server includes a manager, a health check and clean up function, and a backup table. The manager communicates with the agent and manages configuration of the snapshot mirrored volume and the backup table. In addition, the manager uses the health check and clean up function to check the health of the mirrored snapshot volume, thereby avoiding the need to check the health of the production volume. If the mirrored snapshot volume is unhealthy (e.g., individual files or the volume itself have data corruption problems, viruses, etc.), the manager can use the health check and clean up function to repair the damage (e.g., data corruption, viruses, etc.) to the mirrored snapshot volume and/or production via several techniques. The backup table includes information on the production volume and mirrored snapshot volume, such as file system hostname, etc.

The present invention further provides a method for volume health check and recovery. The method comprises gathering information on a target production volume; performing preprocessing for splitting a mirrored pair; splitting the mirrored pair; mounting a snapshot mirrored volume on the backup server, if necessary; running a health check; alerting an administrator if the health check uncovers a problem; performing a recovery process if the health check indicates a problem; and performing post-processing including unmounting the mounted volume and resynchronizing.

The recovery process, when required, can be performed via at least five different techniques. The first technique includes repairing unhealthy files on the mirrored snapshot volume and then copying the repaired files to the production volume. The second technique includes repairing an unhealthy volume and then resynchronizing the mirrored pair. The third technique includes copying healthy files from a second snapshot mirrored volume to the production volume. The fourth technique includes repairing the unhealthy files on the production volume. The fifth technique includes resynchronizing the production volume with a second snapshot mirrored volume that is healthy.

Accordingly, the system and method advantageously enables the health checking of volumes and recovery with little or no disruption of online services.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1-2 is a block diagram illustrating an example computer for use with the present invention;

FIG. 2 is flow diagram illustrating volume health checking;

FIG. 3-1 is a flow diagram illustrating recovery according to a first embodiment of the invention;

FIG. 3-1-1 is a flow diagram illustrating recovery according to a second embodiment of the invention;

FIG. 3-2 is a flow diagram illustrating recovery according to a third embodiment of the invention;

FIG. 3-3 is a flow diagram illustrating recovery according to a fourth embodiment of the invention;

FIG. 3-4 is a flow diagram illustrating recovery according to a fifth embodiment of the invention;

FIG. 4 is a flowchart illustrating a method for volume health check and recovery;

FIG. 8 is a diagram illustrating a backup table.

DETAILED DESCRIPTION OF THE ILLUSTRATED EMBODIMENTS

The following description is provided to enable any person skilled in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
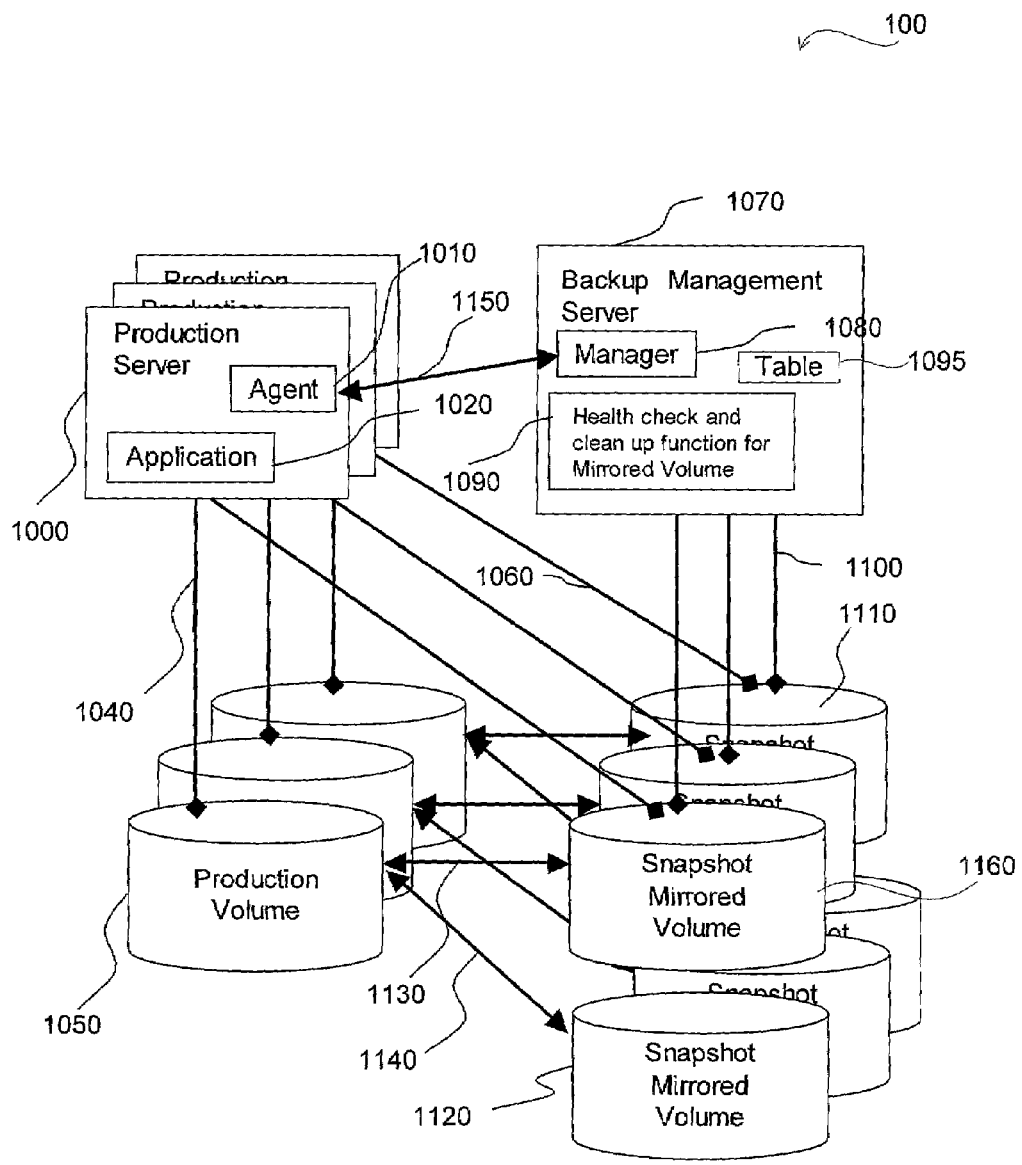
FIG. 1 is a block diagram illustrating a volume health check system.

FIG. 1 is a block diagram illustrating a volume health check system 100. System 100 includes a plurality of production servers, such as production server 1000, with corresponding production volumes, such as production volume 1050, and a backup management server 1070 with corresponding snapshot mirrored volumes, such as volumes 1110 and 1120. The production servers are communicatively coupled to production volumes using logical data connections, such as connection 1040, that may include switches, HBAs, disk subsystem ports, etc. Connection protocols between the production servers and production volumes may include Fibre Channel, SCSCI, FC over IP, etc. In addition, each production volume is communicatively coupled to at least two snapshot mirrored volumes via logical data connections that can be substantially similar to the logical data connections between production servers and productions volumes. (In another embodiment, each production volume is communicatively coupled to a single snapshot mirrored volume.) For example, production volume 1050 is communicatively coupled to snapshot mirrored volumes 1120 and 1160 via logical data connections 1140 and 1130 respectively.

The production servers are also communicatively coupled to the backup manager server 1070 via logical connections, such as logical connection 1150, and also to the snapshot mirrored volumes via logical connections, such as logical connection 1060. In addition, backup management server 1070 is communicatively coupled to snapshot mirrored volumes via logical connections, such as logical connection 1100.

Figures 1, 3:
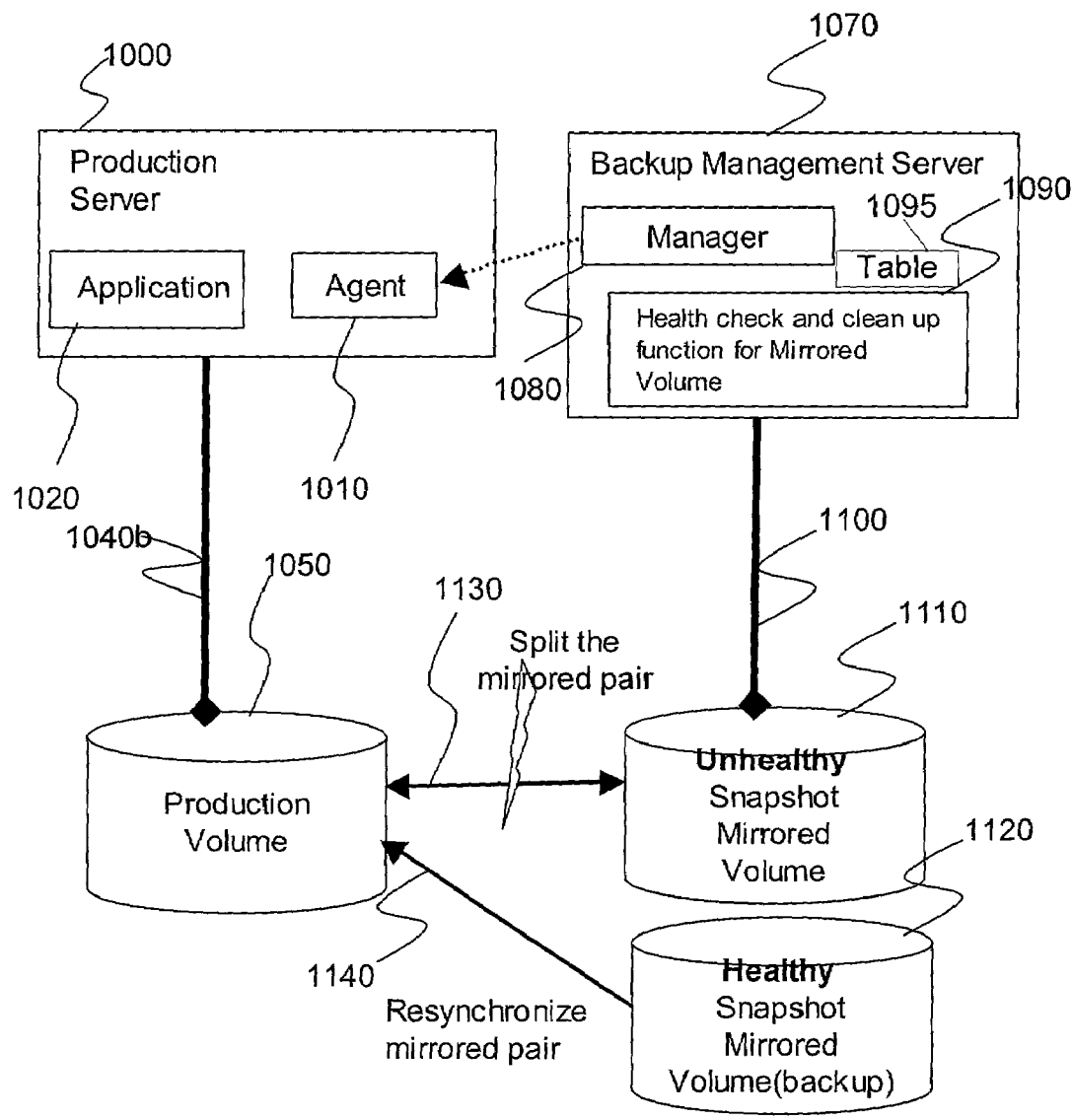
Figures 1, 3:
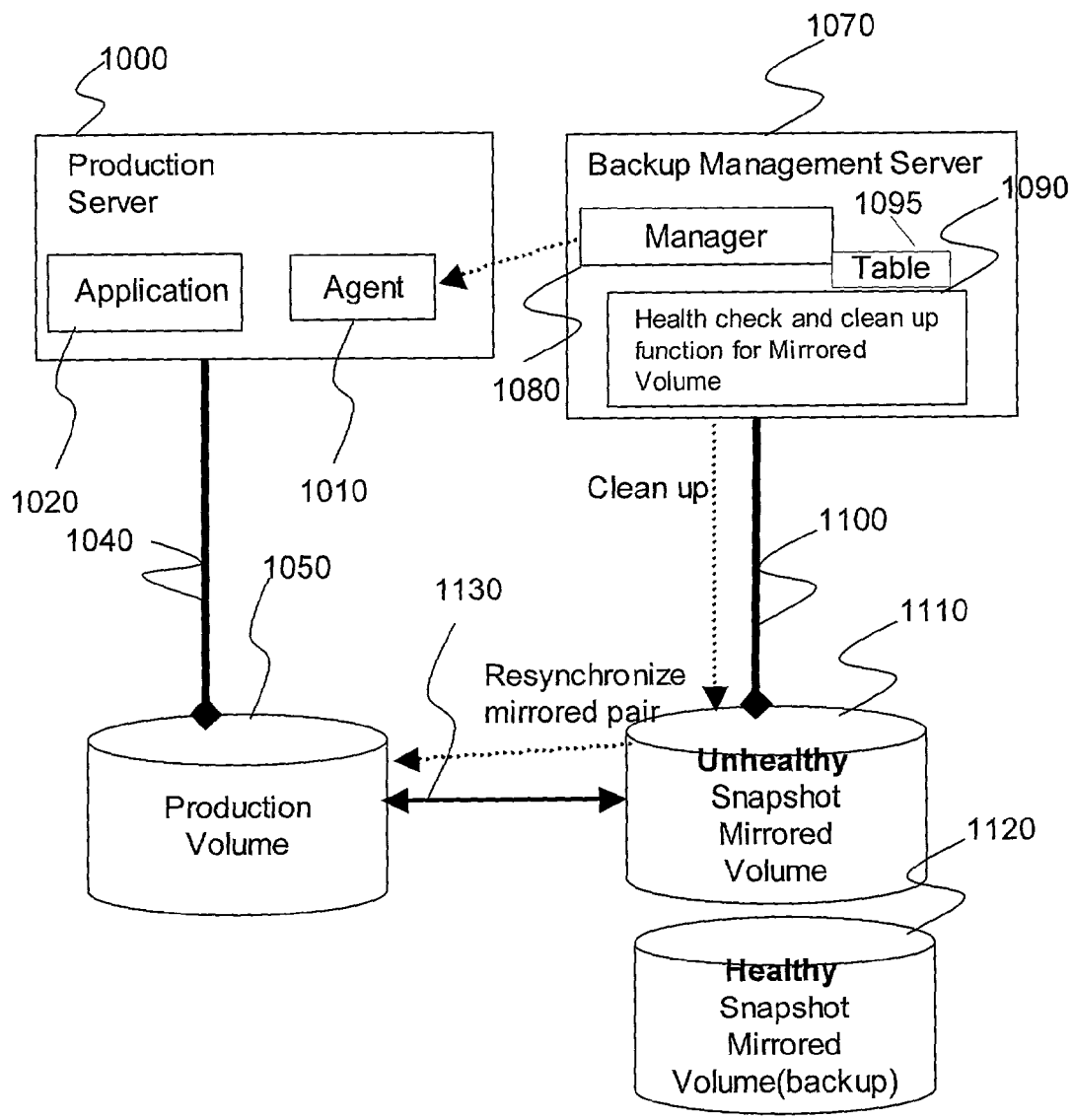
Figures 2, 3:
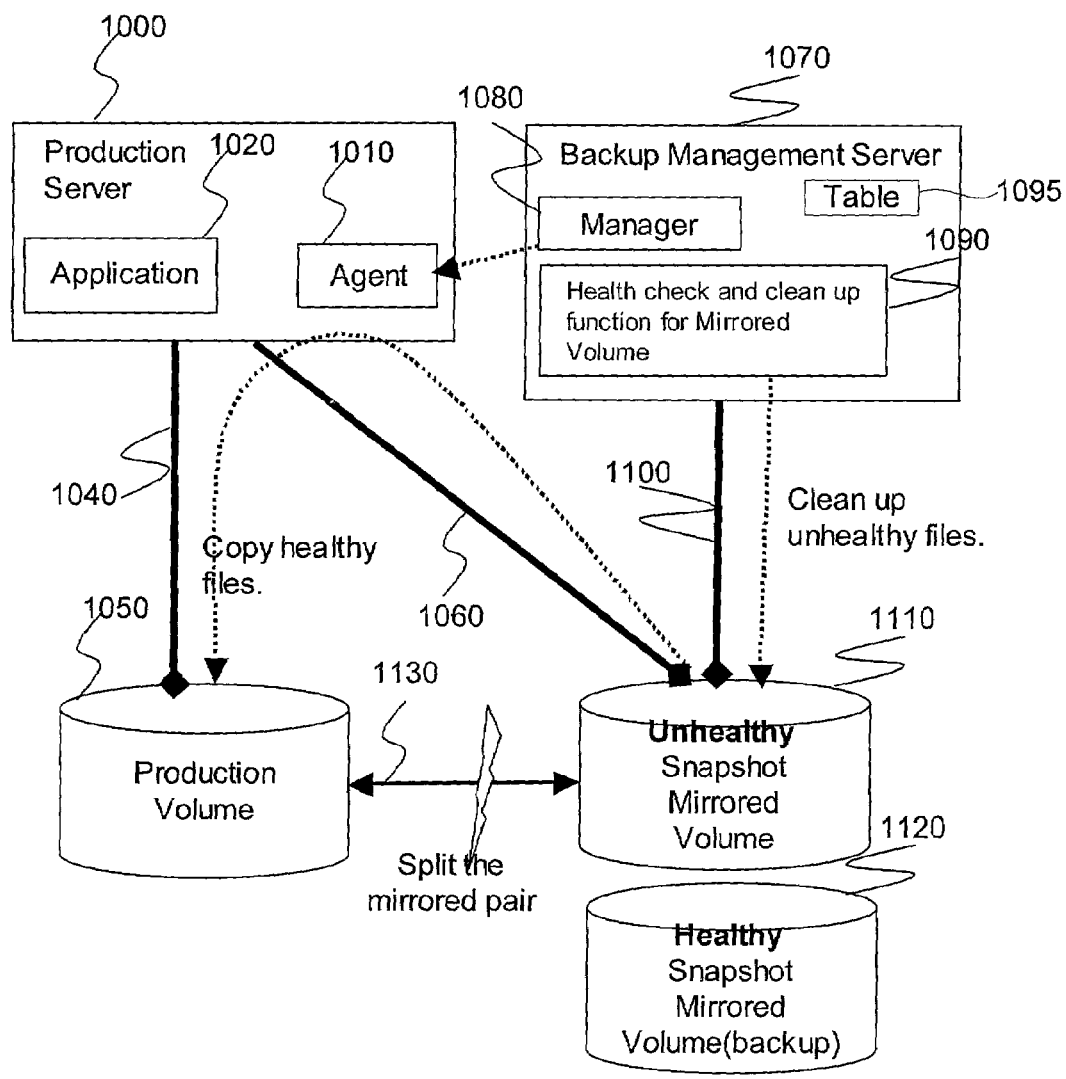
Figure 3:
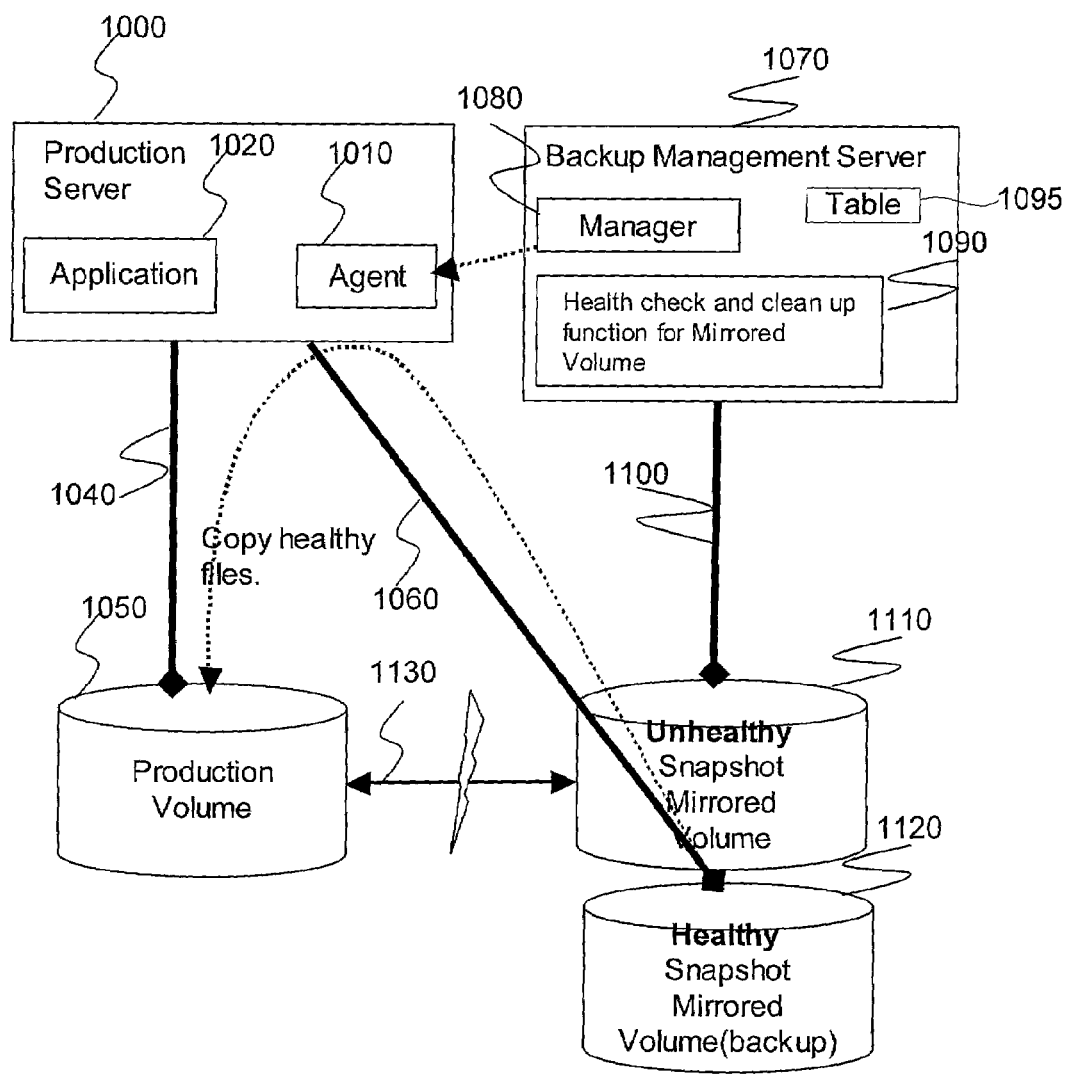
Figures 3, 4:
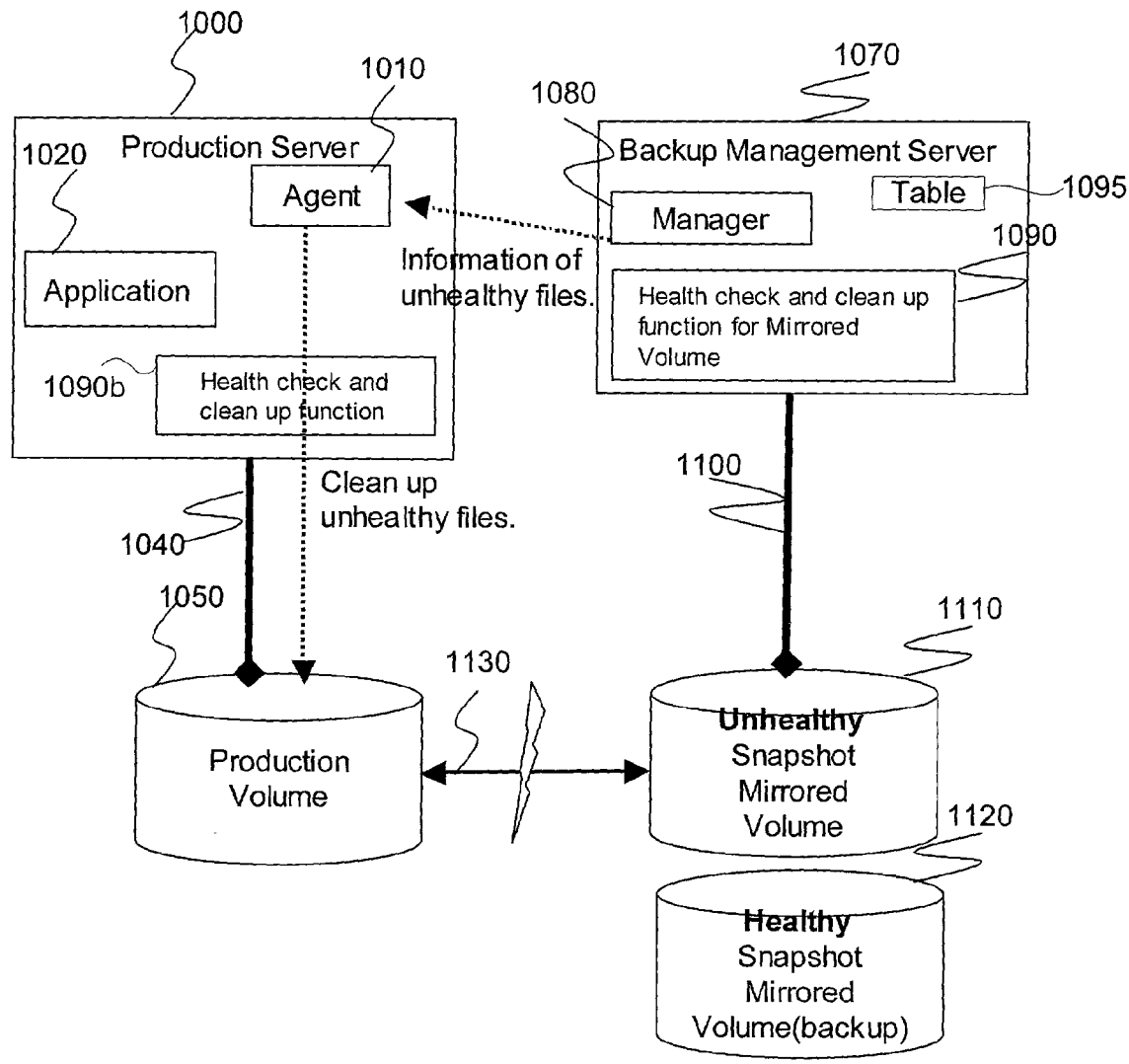
Figure 4:
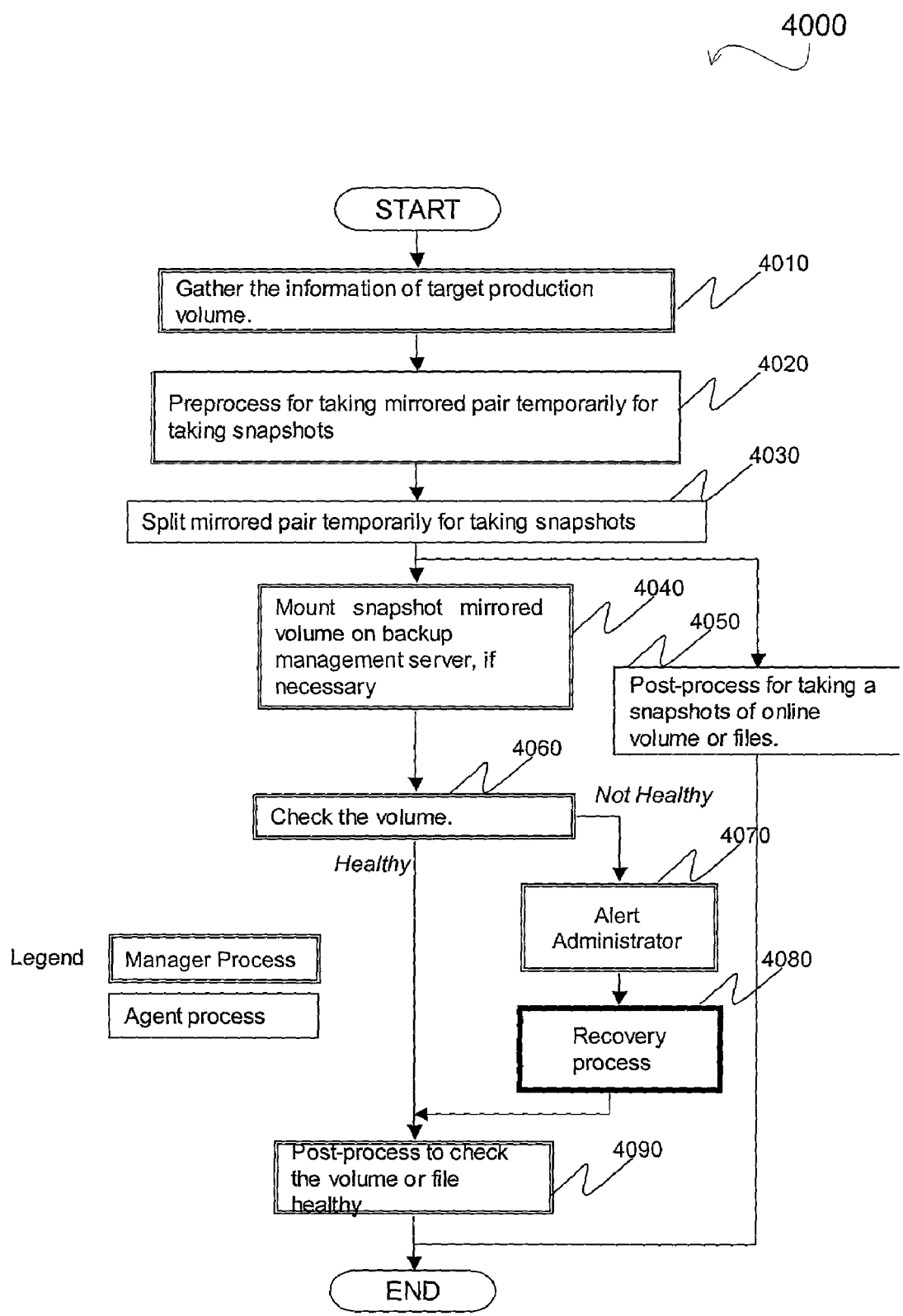

Each production server includes an agent 1010 and at least one application 1020. In an embodiment of the invention, production servers can also include a health check and clean up function 1090*b* (FIG. 3-4). Agent 1010 manages communication to the backup management server 1070, takes snapshots of production volumes, and communicates with application 1020 for pre-process and post-process snapshot purposes. In an embodiment of the invention, the agent 1010 also checks the health of files on production volumes and/or checks the health of the production volumes themselves by invoking health check and clean up function 1090*b*, which may comprise a health check engine and a clean up engine. In another embodiment of the invention, the agent 1010 can repair files on the production volume and/or repair the production volumes themselves by invoking health check and clean up function 1090*b*. Application 1020 includes an application stores and accesses data on a production volume. For example, application 1020 may include a database manager.

Production volumes, such as production volume 1050, are logical volumes that are used by application 1020. The production volumes may include a single physical disk drives, multiple disk drives wherein a disk array controller strips manages the data across various disk drives, or any other type of logical volume.

Backup management server 1070 includes a manager 1080, a health check and clean up function 1090, and a backup table 1095. Manager 1080 manages the configuration of mirroring pair and backup table 1095. Further, the manager 1080 manages, using function 1090, the health check and clean up of snapshot mirrored volumes and/or individual files on the snapshot mirrored volumes. In addition, the manager 1080 communicates with agent 1010 via logical link 1150.

The health check and clean up function 1090 may include an engine or engines (e.g., a health check engine and a clean up engine) for checking volume and/or file health in the snapshot mirrored volumes. In addition, the health check and clean up function 1090 can clean up (e.g., recover, repair, etc.) unhealthy volumes and/or files if necessary. Health checks and associated repairs can be for database corruption, virus removal, and/or other problems.

Backup table 1095 includes information on mirrored pair volumes, such as when each one was suspended (e.g., backed up); what type of file system each volume uses; associated hostname; mount point; application, etc. Backup table 1095 will be discussed in further detail in conjunction with FIG. 8.

Figures 1, 2:
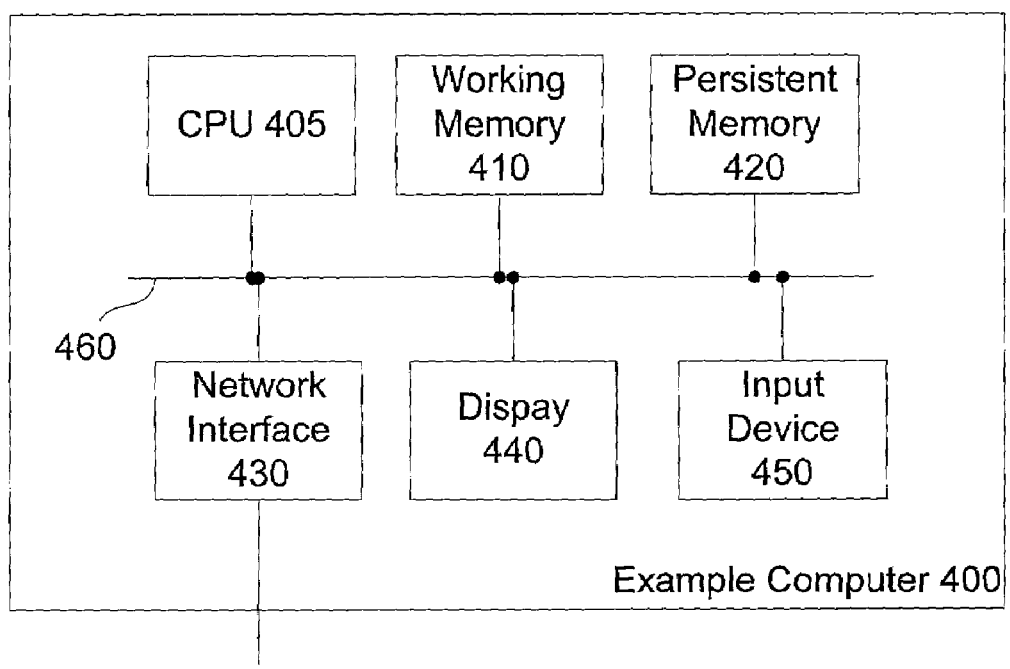
Figure 2:
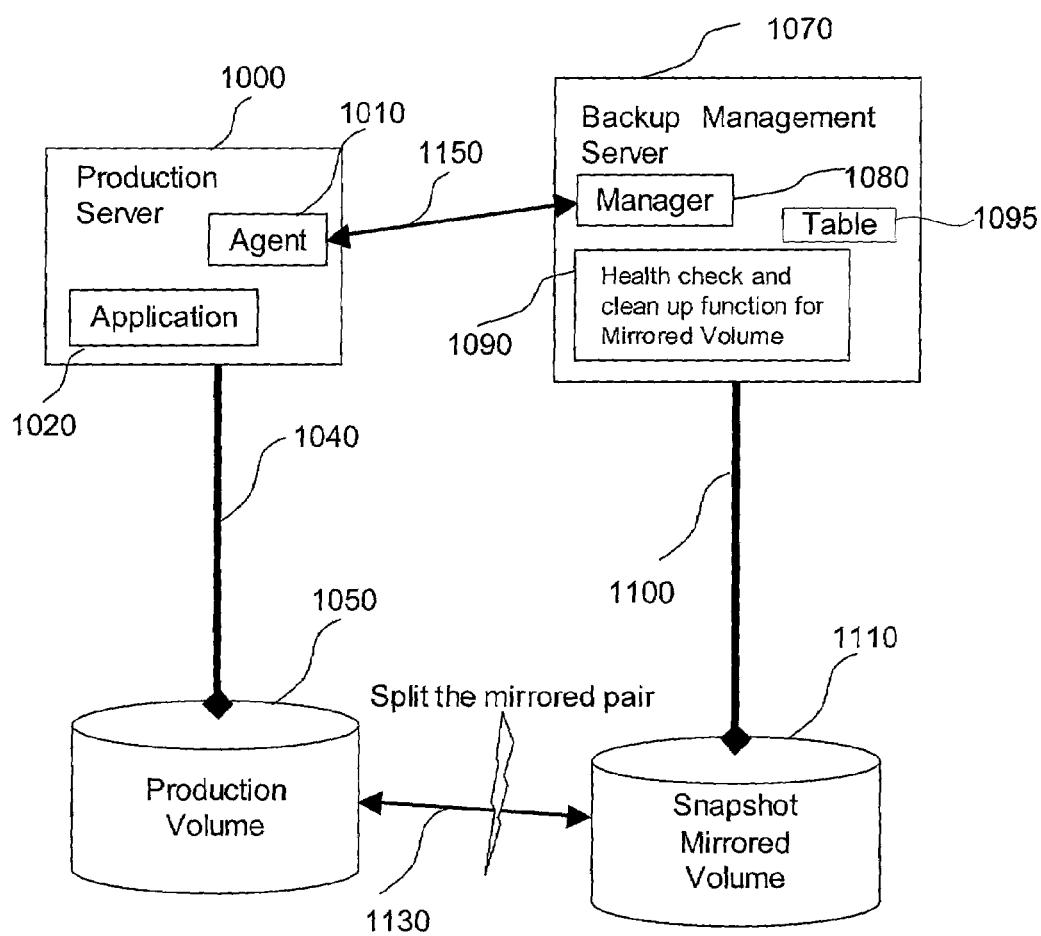

FIG. 1-2 is a block diagram illustrating an example computer 400 in accordance with the present invention. In an embodiment of the invention, the backup management server 1070 and/or production server 1000 may include or be resident on a computer that is substantially similar to example computer 400. The example computer 400 includes a central processing unit ("CPU") 405; working memory 410; persistent memory 420; network interface 430; display 440 and input device 450, all communicatively coupled to each other via system bus 460. CPU 405 a processor capable to execute software stored in persistent memory 420. Working memory 410 may include random access memory ("RAM") or any other type of read/write memory devices or combination of memory devices. Persistent memory 420 may include a hard drive, read only memory ("ROM") or any other type of memory device or combination of memory devices that can retain data after example computer 400 is shut off. Network interface 430 is communicatively coupled, via wired or wireless techniques, to logical connections, such as logical data connections 1040, 1100, and 1060, etc. Display 440 includes a liquid crystal display ("LCD") display, cathode ray tube display or other display device. Input device 450 includes a keyboard, mouse, or other device for inputting data, or a combination of devices for inputting data.

One skilled in the art will recognize that the example computer 400 may also include additional devices, such as network connections, additional memory, additional processors, LANs, input/output lines for transferring information across a hardware channel, the Internet or an intranet, etc. One skilled in the art will also recognize that the programs and data may be received by and stored in the system in alternative ways.

FIG. 2 is flow diagram illustrating volume health checking. In order to check the health of production volume 1050 without disrupting services, such as application 1020, that requires access to production volume 1050, agent 1010 splits the mirrored pair (i.e., production volume 1050 and snapshot mirrored volume 1110) and the health check and clean up function 1090 performs a health check (e.g., volume health check, virus check, etc.) on snapshot mirrored pair 1110, which is identical in contents to production volume 1050. Accordingly, a problem in production volume 1050 will be indicated by a problem in snapshot mirrored volume 1110. Health checking will be discussed in further detail in conjunction with FIG. 4 below.

FIG. 3-1 is a flow diagram illustrating recovery according to a first embodiment of the invention. If a health check, as described in conjunction with FIG. 2 above, indicates that an unhealthy snapshot volume 1110 cannot be cleaned up (e.g., data corruption cannot be corrected, viruses cannot be removed, etc.) then manager 1080 chooses a healthy snapshot mirrored volume 1120 for resynchronization and forwards data identifying volume 1120 to agent 1010 so that agent 1010 can perform the resynchronization with production volume 1050 and healthy snapshot mirrored volume 1120. Accordingly, this recovery technique limits disruption to production volume 1050. This first embodiment recovery technique will be discussed in further detail in conjunction with FIG. 5.

FIG. 3-1-1 is a flow diagram illustrating recovery according to a second embodiment of the invention. If a health check indicates that snapshot mirrored volume 1110 is unhealthy but can be cleaned up then health check and clean up function 1090 cleans up (e.g., removes viruses, fixes data corruption etc.) the unhealthy snapshot mirrored volume 1110. Manager 1080 then notifies agent 1010 that snapshot mirrored volume 1110 has been cleaned up. Agent 1010 can then resynchronize production volume 1050 with mirrored snapshot volume 1110, thereby correcting any problems with production volume 1050 and limiting access disruption. This second embodiment recovery technique will also be discussed in further detail in conjunction with FIG. 5.

FIG. 3-2 is a flow diagram illustrating recovery according to a third embodiment of the invention. If individual unhealthy files can be cleaned, then manager 1080 invokes the health check and clean up function 1090 to clean the unhealthy files. For example, cleaning may include virus removal from files. Manager 1080 then informs agent 1010 of the cleaned up files. Agent 1010 can then copy the cleaned files to the production volume 1050 to replace the corresponding unhealthy files on the production volume 1050 thereby correcting any unclean files on the production volume 1050. This third embodiment will be discussed in further detail in conjunction with FIG. 6.

FIG. 3-3 is a flow diagram illustrating recovery according to a fourth embodiment of the invention. If individual unhealthy files cannot be cleaned, then manager 1080 selects healthy files from a healthy snapshot mirrored volume 1120. Manager 1080 then informs agent is 1010 of the location of these files. Agent 1010 can then copy the files from volume 1120 to the production volume 1050 to replace the corresponding unhealthy files on the production volume 1050 thereby correcting any unclean files on the production volume 1050. This fourth embodiment will be discussed in further detail in conjunction with FIG. 6.

FIG. 3-4 is a flow diagram illustrating recovery according to a fifth embodiment of the invention. If unhealthy files identified by the health check and clean up function 1090 can be repaired, manager 1080 sends a list of those files to agent 1010. Agent 1010 then invokes health check and clean up function 1090b to clean up the unhealthy files on production volume 1050. This fifth embodiment will be discussed in further detail in conjunction with FIG. 7.

FIG. 4 is a flowchart illustrating a method 4000 for volume health check and recovery. Manager 1080 gathers (4010) information on the target production volume 1050. This information includes pair ID; pair group; pair name; file system; device name; mount point; hostname; and application type, etc. The manager 1080 then sends this information to agent 1010 via logical data connection 1150 so that agent 1010 can take a snapshot of production volume 1050.

Agent 1010 then does preprocessing (4020) for splitting the mirrored pair (e.g., production volume 1050 and snapshot mirrored volume 1110). For example, if the application 1020 type is flat file, then agent 1010 can freeze or lock target files or volumes. If the application 1020 type is database, then agent 1010 can invoke an online backup mode for the application 1020.

Agent 1010 then splits (4030) the mirrored pair and informs manager 1080 to mount the snapshot mirrored volume 1110 on backup management server 1070. Manager 1080 then mounts (4040) snapshot mirrored volume 1110 on backup management server 1070, if necessary. After mounting (4040), manager 1080 invokes the health check and clean up function 1090 to check (4060) the health of the snapshot mirrored volume 1110, which is identical to production volume 1050. Accordingly, a problem with production volume 1050 will be mirrored at snapshot mirrored volume 1110.

If the health check (4060) indicates that the snapshot mirrored volume 1110 is healthy, then manager 1080 performs post-processing (4090), which may include unmounting the snapshot mirrored volume 1110, resynchronizing, and updating backup table 1095. The method 4000 then ends.

If the health check (4060) indicates that the snapshot mirrored volume 1110 is unhealthy (e.g., data corruption, infected with a virus, etc.), which indicates that production volume 1050 is unhealthy, then manager 1080 alerts (4070) an administrator that snapshot mirrored volume 1110 or a file on volume 1110 is not healthy via an email message, display on a screen, or via other techniques. Manager 1080 then invokes health check and clean up function 1090 to clean (e.g., recover, repair, etc.) production volume 1050 via one or more methods as will be discussed below in conjunction with FIG. 5, FIG. 6 and FIG. 7. Method 4000 then proceeds to post-processing (4090) as discussed above.

Figure 5:
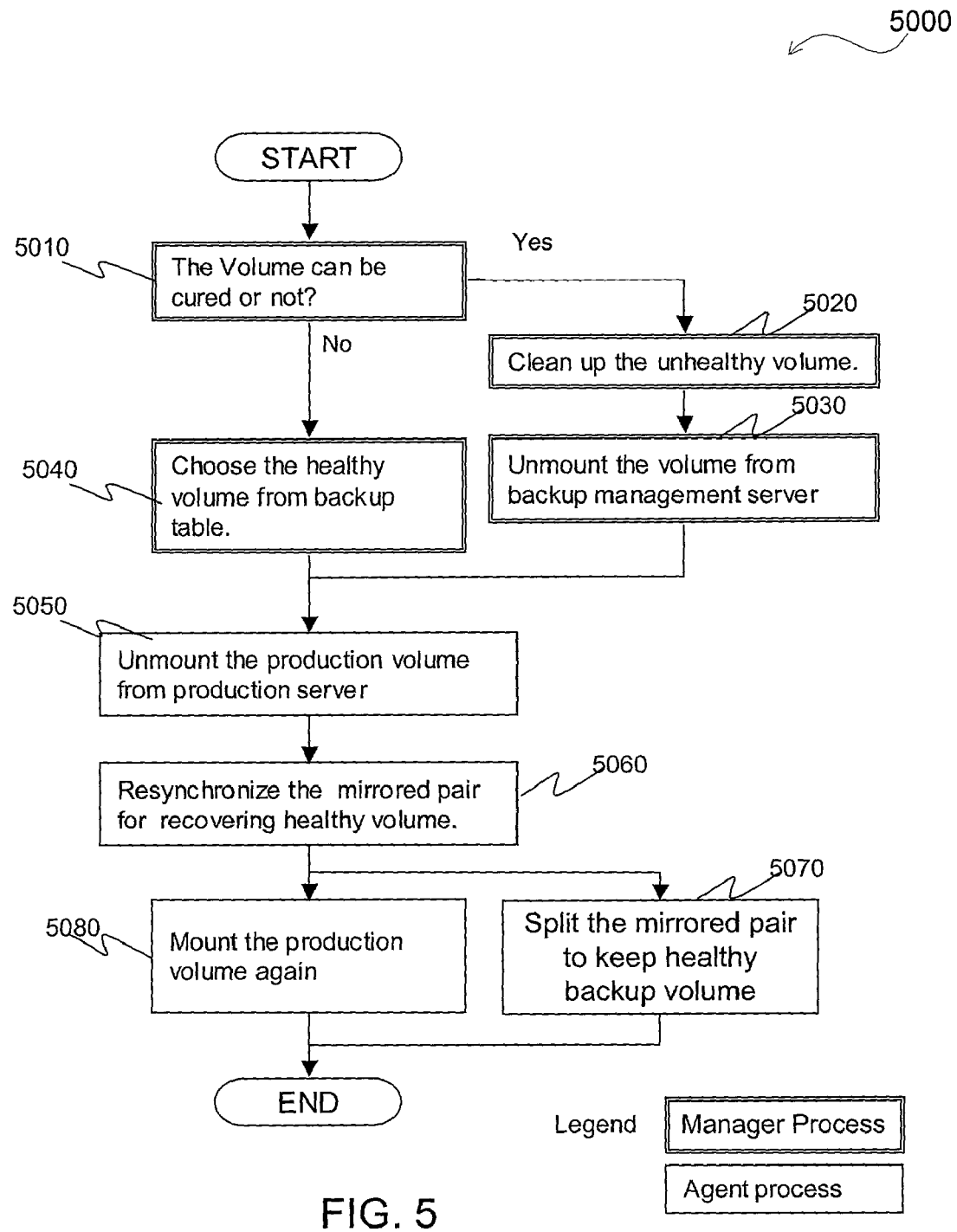
FIG. 5 is a flowchart illustrating a method for recovery using the first and second embodiments.

FIG. 5 is a flowchart illustrating method 5000 for recovery using the first and second embodiments. Manager 1080 determines (5010) if the snapshot mirrored volume 1110, which is identical to the production volume 1050, can be cured. If the snapshot mirrored volume 1110 cannot be cured, then manager 1080 chooses (5040) healthy snapshot mirrored volume 1120 per backup table 1095. In addition, the manager 1080 notifies agent 1010 of the chosen snapshot mirrored volume 1120. If the snapshot mirrored volume 1110 can be cured, then manager 1080 invokes the health check and clean up function (1090) to clean up (5020) the snapshot mirrored volume 1110. The manager 1080 then unmounts (5030) the corrected snapshot mirrored volume 1110 from backup management server 1070 and notifies agent 1010 that snapshot mirrored volume 1110 has been corrected.

After either choosing (5040) or unmounting (5030), agent 1010 unmounts (5050) the production volume 1050 from production server 1000. Agent 1010 then resynchronizes (5060) the mirrored pair using snapshot mirrored volume 1110 if it has been corrected or snapshot mirrored volume 1120 if volume 1110 could not be corrected, thereby restoring production volume 1050 to a healthy state. After resynchronizing (5060) agent 1010 mounts (5080) the production volume 1050 again and splits (5070) the mirrored pair to keep the snapshot mirrored volume (1110 or 1120 depending on which one was used) healthy. The method 5000 then ends.

Figure 6:
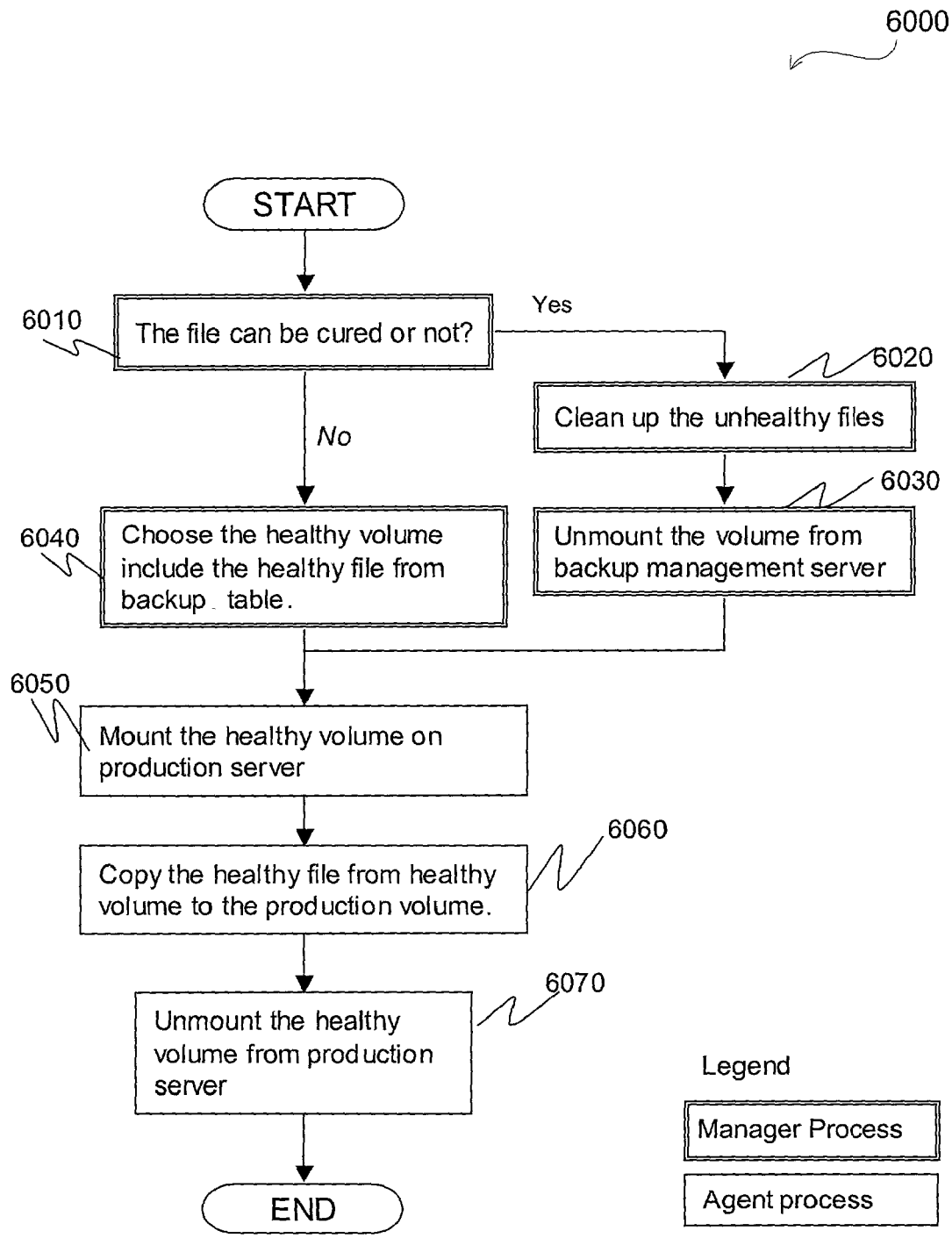
FIG. 6 is a flowchart illustrating a method for recovery using the third and fourth embodiments.

FIG. 6 is a flowchart illustrating a method 6000 for recovery using the third and fourth embodiments. Manager 1080 determines (6010) if unhealthy (e.g., infected, corrupted, etc.) files on snapshot mirrored volume 1110, which are identical to unhealthy files on production volume 1050, can be cured. If the files cannot be cured, then manager 1080 chooses (6040) a healthy snapshot mirrored volume 1120 that has healthy versions of the file per backup table 1095 and notifies agent 1010 of the file names and locations. If the files can be cured, then manager 1080 invokes the health check and clean up function (1090) to clean up the unhealthy files on snapshot mirrored volume 1110 and notifies agent 1010 of the file names and locations. Manager 1080 then unmounts (6030) the snapshot mirrored volume 1110 from backup management server 1070.

After either choosing (6040) or unmounting (6030) agent 1010 mounts (6050) the healthy snapshot mirrored volume 1110 or 1120 onto production server 1000. Agent 1010 then copies the healthy files from either snapshot mirrored volume 1110 or snapshot mirrored volume 1120 to production volume 1050, thereby replacing the unhealthy files on production volume 1050 with healthy files. Agent 1010 then unmounts (6070) the healthy volume (1110 or 1120) from the production server 1000. The method 6000 then ends.

Figure 7:
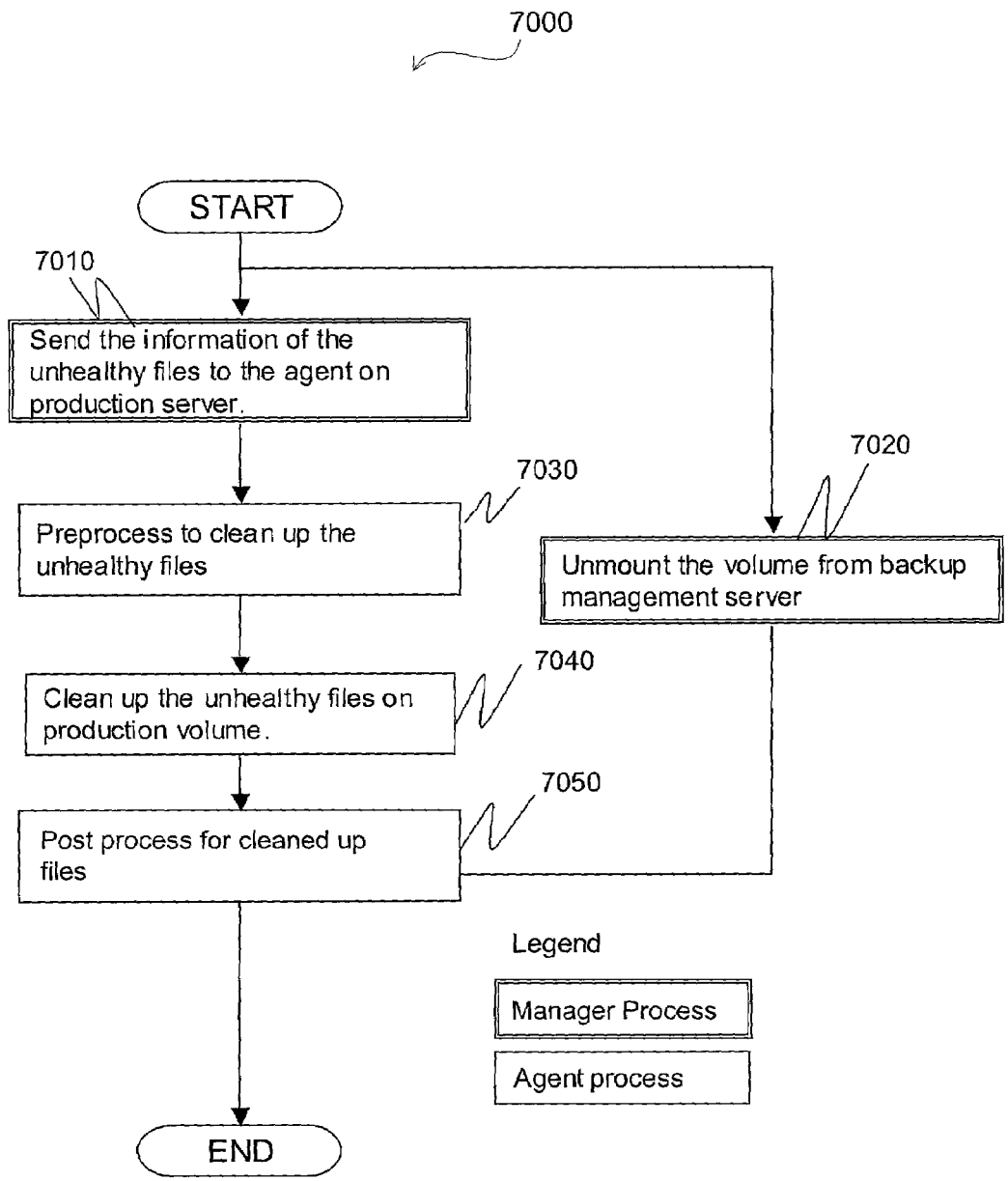
FIG. 7 is a flowchart illustrating a method for recovery using the fifth embodiment.

FIG. 7 is a flowchart illustrating a method 7000 for recovery using the fifth embodiment. Manager 1080 sends (7010) a list of unhealthy files to agent 1010 on the production server 1000 and unmounts (7020) the snapshot mirrored volume 1110 from the backup management server 1070. Agent 1010 then performs preprocessing (7030) such as locking input/output to unhealthy files on production volume 1050. Agent 1010 then invokes health check and clean up function 1090b to clean up (7040) the unhealthy files on production volume 1050. Agent 1010 then performs post processing (7050), such as unlocking input/output to the cleaned up files. The method 7000 then ends.

FIG. 8 is a diagram illustrating a backup table 1095. The table 1095 includes information on Pair ID 8010; Pair Group 8020; Pair Name 8030; Production Volume (Physical) 8050; File System Type (8060); Suspended (Backed Up) Date 8070; Device Name (logical) for Production Volume 8080; Device Name (logical) for paired volume 8090; Mount Point 8100; Production Host 8110; and Application Type 8120 (such as DB, SQL server, DB2, etc.).

Accordingly, the systems and methods of the present invention enable health checks of a production volume by checking the health of a snapshot mirrored volume. This enables checking the health of the production volume without disturbing access to production volumes. In addition, this enables optimal use of backup volumes by cleaning up unhealthy snapshot mirrored volumes or marking them as unhealthy so that they can be rewritten.

The foregoing description of the illustrated embodiments of the present invention is by way of example only, and other variations and modifications of the above-described embodiments and methods are possible in light of the foregoing teaching. For example, an administrator can specify which files and/or volumes to use when snapshot mirrored volume is uncorrectable (in place of manager 1080). Although the network sites are being described as separate and distinct sites, one skilled in the art will recognize that these sites may be a part of an integral site, may each include portions of multiple sites, or may include combinations of single and multiple sites. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method, comprising:
   providing a production volume and a first snapshot mirrored volume of the production volume;
   detecting the health of the first snapshot mirrored volume;
   determining the status of the production volume based on the detected health of the first snapshot mirrored volume; and
   performing a recovery process based on the determined status of the production volume.

2. The method of claim 1, wherein the recovery process includes:
   synchronizing the production volume with a healthy snapshot mirrored volume of the production volume.

3. The method of claim 1, wherein the recovery process includes:
   after the first snapshot mirrored volume is detected to be unhealthy, cleaning up unhealthy files in the first snapshot mirrored volume; and
   synchronizing the production volume with the cleaned up first snapshot mirrored volume.

4. The method of claim 1, wherein the recovery process includes:
   cleaning up unhealthy files on the first snapshot mirrored volume; and
   copying the cleaned up files from the first snapshot mirrored volume to the production volume, thereby replacing unhealthy files on the production volume with the cleaned up files.

5. The method of claim 1, wherein the recovery process includes:
   identifying healthy files on a second snapshot mirrored volume of the production volume, the healthy files corresponding to unhealthy files on the first snapshot mirrored volume; and
   copying the identified healthy files to the production volume, thereby replacing unhealthy files on the production volume with the identified healthy files.

6. The method of claim 1, wherein the recovery process includes:
   cleaning up unhealthy files on the production volume, the unhealthy files corresponding to unhealthy files on the first snapshot mirrored volume.

7. A computer-readable medium storing instructions to cause a computer to perform a method, the method comprising:
   detecting the health of a first snapshot mirrored volume of a production volume;
   determining the status of the production volume based on the detected health of the first snapshot mirrored volume; and
   performing a recovery process based on the determined status of the production volume.

8. The computer-readable medium of claim 7, wherein the recovery process includes:
   synchronizing the production volume with a healthy snapshot mirrored volume of the production volume.

9. The computer-readable medium of claim 7, wherein the recovery process includes:
   after the first snapshot mirrored volume is detected to be unhealthy, cleaning up unhealthy files in the first snapshot mirrored volume; and
   synchronizing the production volume with the cleaned up first snapshot mirrored volume.

10. The computer-readable medium of claim 7, wherein the recovery process includes:
    cleaning up unhealthy files on the first snapshot mirrored volume; and
    copying the cleaned up files from the first snapshot mirrored volume to the production volume, thereby replacing unhealthy files on the production volume with the cleaned up files.

11. The computer-readable medium of claim 7, wherein the recovery process includes:
    identifying healthy files on a second snapshot mirrored volume of the production volume, the healthy files corresponding to unhealthy files on the first snapshot mirrored volume; and
    copying the identified healthy files to the production volume, thereby replacing unhealthy files on the production volume with the identified healthy files.

12. The computer-readable medium of claim 7, wherein the recovery process includes:

cleaning up unhealthy files on the production volume, the unhealthy files corresponding to unhealthy files on the first snapshot mirrored volume.

13. A system, comprising:
means for detecting the health of a snapshot mirrored volume of a production volume;
means for determining the status of the production volume based on the detected health of the first snapshot mirrored volume; and
means for performing a recovery process based on the determined status of the production volume.

14. A system, comprising:
a health engine operable to detect the health of a first snapshot mirrored volume of a production volume and to determine the status of the production volume based on the detected health of the first snapshot mirrored volume; and
a recovery engine, communicatively coupled to the health engine, operable to perform a recovery process based on the determined status of the production volume.

15. The system of claim 14, wherein the recovery process includes:
synchronizing the production volume with a healthy snapshot mirrored volume of the production volume.

16. The system of claim 14, wherein the recovery process includes:
after the first snapshot mirrored volume is detected to be unhealthy, cleaning up unhealthy files in the first snapshot mirrored volume; and
synchronizing the production volume with the cleaned up first snapshot mirrored volume.

17. The system of claim 14, wherein the recovery process includes:
cleaning up unhealthy files on the first snapshot mirrored volume; and
copying the cleaned up files from the first snapshot mirrored volume to the production volume, thereby replacing unhealthy files on the production volume with the cleaned up files.

18. The system of claim 14, wherein the recovery process includes:
identifying healthy files on a second snapshot mirrored volume of the production volume, the healthy files corresponding to unhealthy files on the first snapshot mirrored volume; and
copying the identified healthy files to the production volume, thereby replacing unhealthy files on the production volume with the identified healthy files.

19. The system of claim 14, wherein the recovery process includes:
cleaning up unhealthy files on the production volume, the unhealthy files corresponding to unhealthy files on the first snapshot mirrored volume.

20. A method for checking the health of a production volume, comprising:
detecting the health of a snapshot mirrored volume of the production volume;
determining the health of the production volume based on the detected health of the snapshot mirrored volume by checking the health of the snapshot mirrored volume as a representative for the production volume, thereby enabling reduced processing power demand on the production volume.

* * * * *